United States Patent [19]

Strong

[11] 4,402,380
[45] Sep. 6, 1983

[54] APPARATUS AND METHOD FOR SUPPORTING A TRANSMISSION

[75] Inventor: John R. Strong, Kirkland, Wash.

[73] Assignee: Paccar Inc., Bellevue, Wash.

[21] Appl. No.: 277,624

[22] Filed: Jun. 26, 1981

[51] Int. Cl.³ .............................................. B60K 17/00
[52] U.S. Cl. ................................ 180/292; 180/70 R;
180/312; 403/391
[58] Field of Search ...................... 180/70.1, 75.2, 291,
180/292, 312; 403/391

[56] References Cited

U.S. PATENT DOCUMENTS

| | | | |
|---|---|---|---|
| 1,336,008 | 4/1920 | Whitten | 180/70.1 |
| 1,752,809 | 4/1930 | Riordan | 180/292 |
| 3,139,152 | 6/1964 | Bajer | 180/292 |
| 3,236,326 | 2/1966 | Reynolds | 180/292 |
| 4,039,038 | 8/1977 | Wilhelm | 180/70.1 |

Primary Examiner—Joseph F. Peters, Jr.
Assistant Examiner—Donn McGiehan
Attorney, Agent, or Firm—Seed, Berry, Vernon & Baynham

[57] ABSTRACT

A lightweight and inexpensive apparatus for supporting a transmission allows for standardized positioning of mounting brackets on a frame during assembly and readily accommodates minor variations in the positioning of transmissions during the assembly. The apparatus generally comprises a pair of mounting brackets placed in the standardized positions on the frame, a spring which extends between the mounting brackets across the frame, a bushing on the spring which rigidly attaches to the spring and which is capable of receiving a rod which rigidly extends from the transmission, and a rod which is rigidly connected to the transmission. A method of installing variable sized and located transmissions to a fixed location on a vehicle frame.

20 Claims, 4 Drawing Figures

U.S. Patent  Sep. 6, 1983  4,402,380
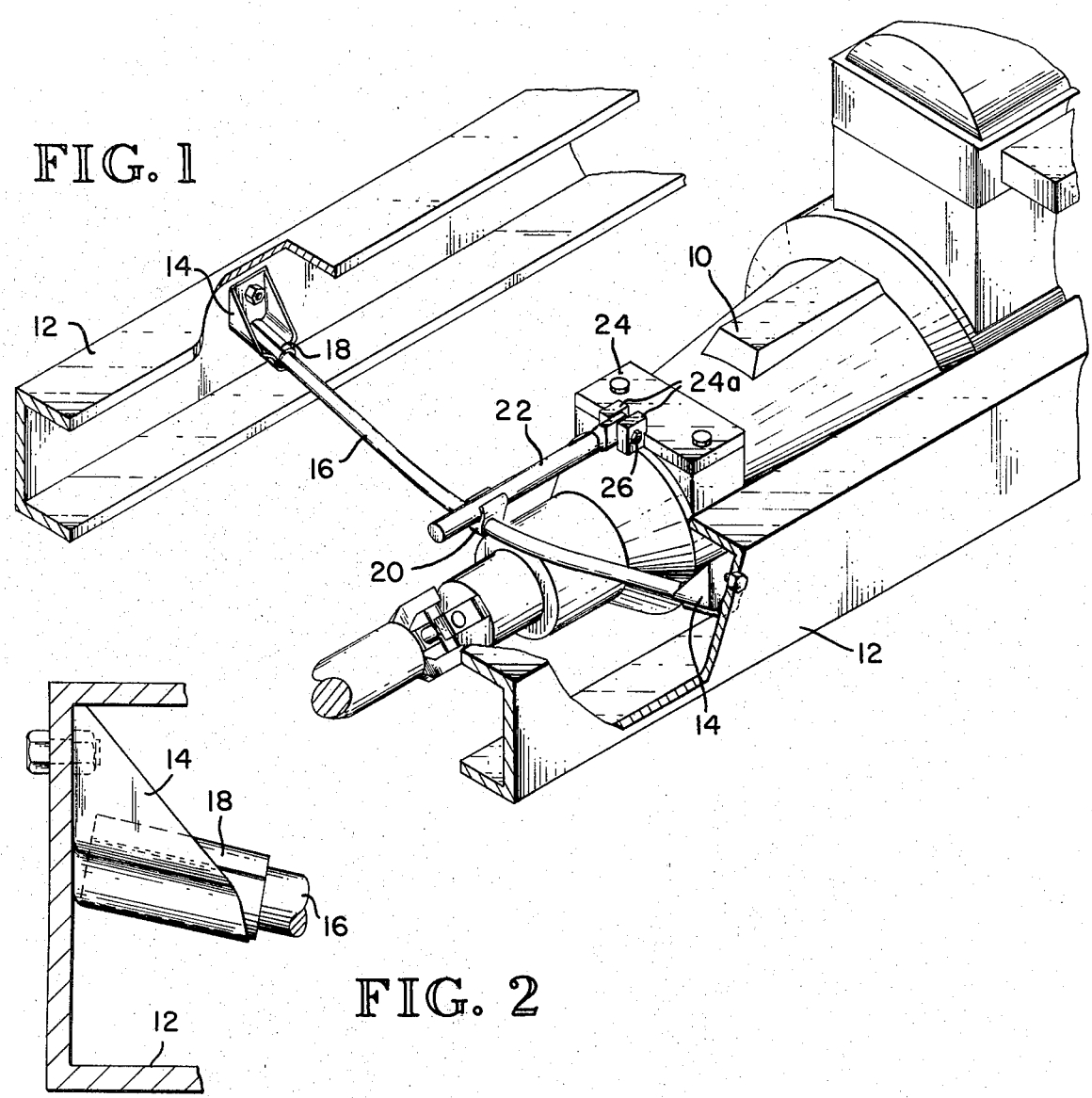
FIG. 1
FIG. 2
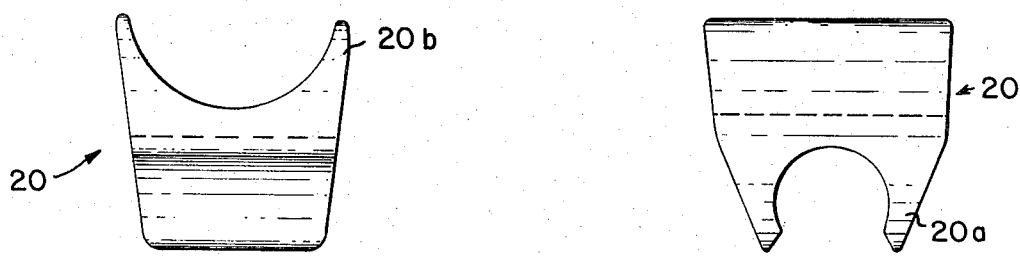
FIG. 3
FIG. 4

APPARATUS AND METHOD FOR SUPPORTING A TRANSMISSION

DESCRIPTION

Technical Field

This invention relates to a lightweight and inexpensive apparatus for supporting a transmission which allows for standardized positioning of mounting brackets on a frame during assembly and which readily accommodates minor variations in the positioning of transmissions during the assembly. More particularly, to support the transmission, the invention uses a transverse spring and a cantilevered rod connected together with a bushing.

BACKGROUND ART

Large transmissions must be supported resiliently at their rear ends to protect against large shock loading. Ordinarily, because transmissions and/or motors vary in size and shape, supporting a transmission requires placement of mounting brackets on the frame after the transmission is placed in the vehicle. This specialized placement of the mounting brackets and support for the transmission slows the assembly-line process. Individualized fine tuning of the attachments is necessary to accommodate the minor variations which often occur during the assembly of the vehicle. Although many attempts have been made to alleviate this specialized positioning problem, to date, an inexpensive, lightweight, and easily usable apparatus has not been developed which allows for standardized positioning of the mounting brackets on a frame during the assembly and which readily accommodates the minor variations in the positioning of transmissions during the assembly.

DISCLOSURE OF INVENTION

A lightweight and inexpensive apparatus for supporting a transmission allows for standardized positioning of mounting brackets on a frame during the assembly process and readily accommodates minor variations in the positioning of transmissions during that assembly. The apparatus easily accommodates variations due to differences in engines and transmissions. Furthermore, the spring, which forms a major portion of the apparatus, is isolated to a greater extent from torque caused by frame racking or engine twisting.

Preferably, the spring is about a ¾-inch (1.9 cm) diameter rod of pultruded fiberglass having a spring rate of about three hundred pounds per inch (300 lb/in). A round spring allows different angles to be accommodated easily without effecting the stiffness of the spring. Often, the rods will cantilever at different angles from the transmission. The spring is preloaded before the rod is rigidly affixed to the transmission. The rod is variably positionable. Therefore, the apparatus of this invention eliminates the need for precise measuring and drilling of holes along the frame for the spring mounting bracket, which are otherwise necessary to ensure that the maximum moment on the transmission is within the prescribed specifications. Preloading gives a simpler, more accurate measure of the moment. The mounting brackets are placed in standard positions, and the rod is used to achieve the needed variations to achieve the desired preloading.

The rod, which cantilevers from the transmission, is preferably aluminum so that it is strong enough to support the transmission yet light enough to be advantageously used in automobile design. Because aluminum is deformable, a pinch bolt may be used to secure the rod rigidly to the transmission after a preload is placed upon the spring.

This transmission support isolates the transmission from the frame and engine better. That is, less torque is transmitted through the parts of the apparatus of this invention than with other transmission supports, so racking and twisting effect the transmission less.

The bushing is preferably an integral piece of plastic having a C-clamp means on its bottom to connect the bushing to the spring and a U-shaped saddle at the top positioned substantially ninety degrees from the axis of the C-clamp means to connect the rod. Of course, the axis of the C-clamp means and the axis for the the U-shaped saddle are actually somewhat skewed from one another, being out of the same plane. In use, the C-clamp rigidly fixes the bushing to the spring, while the saddle accommodates the rod which cantilevers from the transmission. Only a loose connection is needed for support of the rod, although a tighter connection or a complete surrounding of the rod may be used if desired.

To preserve the spring against wear in the mounting brackets and to give it longer life, wear sleeves, which are metal split cylinders of pipe, for example, may be press fit on each end of the spring where the spring rests in the mounting brackets.

The method of installing the apparatus of this invention constitutes a new and patentable method. To install the apparatus, mounting brackets are placed in standardized positions on the frame and the spring is extended across the frame between the mounting brackets. A preload is applied to the spring to bow it slightly and the preload is maintained by resting the transmission on the spring through a bushing. Ordinarily, the transmission is rested on the spring by first bearing a rod downward on the bushing, then rigidly affixing the end of the rod to a mounting plate on the transmission. This method allows for easy accommodation of minor variations in the types of engines and the types of transmissions.

BRIEF DESCRIPTION OF THE DRAWINGS

FIG. 1 is an isometric view of the apparatus of this invention.

FIG. 2 is a detailed cross-section of a mounting bracket of this invention.

FIGS. 3 and 4 are side elevations at right angles to one another of a preferred bushing of this invention.

BEST MODE FOR CARRYING OUT THE INVENTION

A lightweight and inexpensive apparatus for supporting a transmission allows for standardized positioning of the mounting brackets on a vehicle's frame during assembly and readily accommodates variations in positioning of transmissions during the assembly. A pair of mounting brackets are positioned in standardized positions on opposite sides of the frame. A spring extends between the mounting brackets across the frame and holds a bushing which is capable of receiving a rod which cantilevers rigidly from the transmission. The rigid rod supports the transmission through the bushing and spring. This transmission rear support allows for the use of different engines and different transmissions while maintaining one standardized position for the mounting brackets on the frame. The angle that the rod takes when attached to the transmission is variable, and the position of the bushing on the spring is also variable. Therefore, minor variations in the angle of the transmission or in its position along the frame may be easily accommodated with the apparatus of this invention.

As seen in FIG. 1, a transmission 10 is positioned between two side frame members 12. Support for the transmission 10 is provided by the apparatus of this invention. A pair of mounting brackets 14 are initially positioned along the frames 12 in standardized position. Preferably, a 13/16-inch diameter, unidirectional, fiberglass, pultruded rod extends between the mounting brackets 14 and serves as a spring 16. On each end, where the spring 16 rests upon the mounting brackets 14, a split cylinder of metal pipe 18 is positioned on the end of the spring 16. The split cylinders 18 reduce the wear on the spring 16 and greatly increase its life. While a fiberglass, pultruded rod is preferred for the spring, other springs may be used in this invention. A preferred spring will be lightweight and inexpensive, and should be able to accommodate minor variations in the angle at which a rod supporting the transmission and cantilevered from a transmission mount contacts the spring. Therefore, a round spring is highly preferred, especially one that has a spring rate of about three hundred pounds per inch. A round spring provides uniform stiffness which is independent of the angle at which a rod contacts the spring. It will be recognized that alternative springs may be used in this invention.

A bushing 20 snaps into the spring 16 with a C-clamp 20a which frictionally holds the bushing 20 to the spring 16. A preferred C-clamp 20a is best shown in FIG. 4. Extending upwardly as an integral upper part of the bushing 20 is a U-shaped saddle 20b, best shown in FIG. 3. While the C-clamp 20a firmly grips the spring 16, the U-shaped saddle 20b need only be a resting place for the rod 22, which cantilevers from the transmission 10. Because the rod 22 may be of a variety of shapes and still perform its function, the saddle 20b is preferably designed to receive a variety of shapes. The saddle 20b functions as a bearing surface for the rod 22 to transfer the weight of the rod to the spring 16. The gentle cupping of the saddle 20b ensures that the rod 22 will not slide from its bearing position. Preferably, the bushing 20 is made from plastic, such as a nylon or an acetal. The rod 22 preferably is a solid piece of aluminum and is of sufficient length to extend from a mounting plate 24 on the transmission 10 to the spring 16. The mounting plate 24 has suitable receiving means 24a, such as spaced ears extending from a forward edge of the plate to receive the rod 22 and to hold the rod rigidly. The rigid connection is usually accomplished by pinching the ears of the receiving means 24 with a bolt 26 and forcing lock washers (not shown) against the rod 22 to deform the rod. Although the plate may have a rod extending rigidly from it, it is preferred that the rod 22 be detachable from the mounting plate 24 so that in installing the apparatus of this invention, a preload may be first placed on the spring 16, the rod 22 be positioned in the bushing 20 and, finally, attached to the transmission 10 through the mounting plate 24. This method of installation ensures standardized positioning of the mounting brackets. Greater tolerances are allowed by having the rod 22 initially detached from the mounting plate 24. Subsequent rigid attachment allows accommodation of a much greater number of angles between the spring 16 and the transmission 10.

I claim:

1. A lightweight and inexpensive apparatus for supporting the rear end of a cantilevered transmission, which allows for standardized positioning of mounting brackets on a frame during assembly and which readily accommodates minor variations in the positioning of the transmission during assembly, comprising:
   (a) a pair of mounting brackets in standard positions on the frame;
   (b) a spring extending between the mounting brackets across the frame;
   (c) rod receiving means on the spring capable of receiving a variably positioned rod which rigidly extends from the cantilevered transmission; and
   (d) a rod rigidly connected to the transmission and extending to the rod receiving means,
wherein the rod supports the transmission through the rod receiving means and spring.

2. The apparatus of claim 1 wherein the spring is round to accommodate various angles without effecting the stiffness of the spring.

3. The apparatus of claim 1 wherein the spring has a spring rate of about 300 lb/in.

4. The apparatus of claim 1, further comprising means for connecting the rod to the transmission allowing rigid fixing of the rod to the transmission after positioning and preloading of the spring.

5. The apparatus of claim 4 wherein the means for connecting the rod to the transmission includes:
   (a) a mounting plate attached to the transmission and having a receiving means for the rod; and
   (b) means associated with the receiving means on the mounting plate to hold the rigid rod.

6. The apparatus of claim 1 wherein the apparatus is sufficiently flexible so that the apparatus is capable of accommodating frame deflections experienced during normal use without harm to the apparatus.

7. The apparatus of claim 1 wherein each mounting bracket is bolted to the frame at a predetermined location prior to positioning of the transmission on the frame and wherein the rod and rod receiving means accommodate the spacing between the spring and the rear end of the transmission.

8. A lightweight and inexpensive apparatus for supporting a transmission, which allows for standardized positioning of mounting brackets on a frame during assembly and which readily accommodates minor variations in the positioning of transmissions during assembly, comprising:
   (a) a pair of mounting brackets in standard positions on the frame;
   (b) a spring extending between the mounting brackets across the frame;
   (c) rod receiving means on the spring capable of receiving a variably positioned rod which rigidly extends from the transmission; and
   (d) a rod rigidly connected to the transmission and extending to the rod receiving means,
wherein the rod supports the transmission through the rod receiving means and spring, and
   wherein the rod receiving means has an integral C-clamp to connect to the spring and a U-shaped saddle, whose axis is positioned substantially ninety degrees to the axis of the C-clamp and spring, to receive the rod.

9. The apparatus of claim 8 wherein the spring is preloaded before being connected with the rigid rod.

10. The apparatus of claim 8 wherein the spring includes split cylinders on the ends to reduce wear on the spring when it rests in the mounting brackets.

11. The apparatus of claim 8 wherein the spring is fiberglass.

12. A lightweight and inexpensive apparatus for supporting a transmission which allows for standardized positioning of mounting brackets on a frame during assembly and which readily accommodates minor variations in the positioning of transmissions during the assembly, comprising:
   (a) a pair of mounting brackets in standard positions on opposite sides of the frame;
   (b) a spring extending between the mounting brackets across the frame;
   (c) rod receiving means on the spring capable of receiving a variably positioned rod which rigidly extends from the transmission;
   (d) a rod rigidly connected to the transmission and extending to the rod receiving means, and
   (e) means for connecting the rod to the transmission after positioning and preloading of the spring, including:
   a mounting plate attached to the transmission and having a receiving means for the rod; and means associated with the receiving means on the mounting plate to hold the rigid rod,
   wherein the means associated with the receiving means is a bolt which passes through the rod and which rigidly holds the rod by deforming the rod in the receiving means, and
   wherein the rod supports the transmission through the rod receiving means and spring.

13. A lightweight and inexpensive apparatus for supporting the rear end of a cantilevered transmission, which allows for standardized positioning of mounting brackets on a frame during assembly and which readily accommodates minor variations in positioning transmissions during assembly, comprising:
   (a) a pair of mounting brackets in standard positions on opposite sides of the frame;
   (b) a round, preloaded spring extending across the frame between the mounting brackets;
   (c) a plastic rod receiving means on the spring capable of receiving a rod which extends rigidly from the cantilevered transmission;
   (d) a rod rigidly connected to the cantilevered transmission and extending to the rod receiving means; and
   (e) means for rigidly connecting the rod to the cantilevered transmission.

14. A lightweight and inexpensive apparatus for supporting a transmission which allows for standardized positioning of mounting brackets on a frame during assembly and which readily accommodates minor variations in the positioning of transmissions during assembly, comprising:
   (a) a pair of mounting brackets in standard positions on opposite sides of the frame;
   (b) a round spring extending across the frame between the mounting brackets;
   (c) a plastic rod receiving means on the spring capable of receiving a rod which extends rigidly from the transmission;
   (d) a rod rigidly connected to the transmission and extending to the rod receiving means; and
   (e) means for rigidly connecting the rod to the transmission,
   wherein the rod receiving means is an integral piece having a C-clamp to connect to the spring and a U-shaped saddle whose axis is positioned substantially ninety degrees to the axis of the C-clamp means and spring so that the saddle can receive the rod.

15. A lightweight and inexpensive apparatus for supporting a transmission which allows for standardized positioning of mounting brackets on a frame during assembly and which readily accommodates minor variations in the positioning of transmissions during assembly, comprising:
   (a) a pair of mounting brackets in standard positions on opposite sides of the frame;
   (b) a round spring extending across the frame between the mounting brackets;
   (c) a plastic rod receiving means on the spring capable of receiving a rod which extends rigidly from the transmission;
   (d) a rod rigidly connected to the transmission and extending to the rod receiving means; and
   (e) means for rigidly connecting the rod to the transmission.
   wherein the means for rigidly connecting the rod to the transmission includes:
   a mounting plate attached to the transmission and having a receiving means for the rod; and
   a bolt receivable in the receiving means and capable of passing through the rod,
   so that the bolt and receiving means are capable of rigidly holding the rod by deforming the rod.

16. A method for flexibly supporting the rear end of a transmission on a frame comprising the steps of:
   (a) placing mounting brackets in standard, predetermined positions on the frame;
   (b) extending a round spring across the frame between the mounting brackets;
   (c) mounting the transmission to the frame so that the transmission is cantilevered from an engine block attached to the frame;
   (d) preloading the spring; and
   (e) maintaining the preload on the spring by resting the transmission on the spring, including the substeps of placing a bushing on the spring, positioning a rod to extend from the transmission to the bushing, and rigidly connecting the rod to the transmission to flexibly support the transmission.

17. A lightweight and inexpensive apparatus for flexibly supporting the rear end of a cantilevered transmission, the apparatus allowing for standardized positioning of mounting brackets on a frame during assembly and accommodating minor variations in the positioning of the transmission during the assembly, comprising:
   (a) a pair of mounting brackets in predetermined, standardized positions on the frame;
   (b) a preloaded, round spring extending between the mounting brackets across the frame;
   (c) a bushing attached to the spring and capable of receiving a rod which rigidly extends from the rear end of the cantilevered transmission; and
   (d) a rod rigidly mounted to the transmission and extending to the bushing,
   wherein the bushing is an integral piece having a C-clamp to connect the bushing to the spring and a U-shaped saddle to receive the rod, the axis of the saddle being substantially perpendicular to the axis of the C-clamp, if the axes were in the same plane.

18. An apparatus for supporting a transmission which allows standardized positioning of mounting brackets on a frame while accommodating variations in the assembled position of a transmission mounted to the frame, comprising:
  (a) a pair of mounting brackets in standard positions on the frame, the positions determined prior to positioning of the transmission on the frame;
  (b) a flexible preloaded spring extending between the mounting brackets across the frame;
  (c) a rod rigidly attached to the transmission and projecting a sufficient distance beyond the rear end of the transmission to overlie the spring; and
  (d) a receiver on the spring to interconnect the spring and rod,
wherein the rod and receiver combination accommodates variations in the longitudinal and vertical positioning of the transmission relative to the spring.

19. An apparatus for supporting a transmission, comprising:
  (a) a pair of mounting brackets mounted on a vehicle frame;
  (b) a flexible preloaded spring extending between the mounting brackets across the frame;
  (c) a rod rigidly attached to the transmission and projecting a sufficient distance beyond the rear end of the transmission to overlie the spring; and
  (d) a receiver on the spring to interconnect the spring and rod,
wherein the rod and receiver combination accommodates variations in the longitudinal and vertical positioning of the transmission relative to the spring, so that a portion of the rod rests on the receiver, the portion being determined by the actual position of the transmission.

20. The apparatus of claim 19 wherein the receiver includes a passage directed substantially parallel to the longitudinal axis of the frame, wherein the saddle receives the rod and supports the rod at any desired portion of the rod.

* * * * *